(12) United States Patent
Dashti Moghaddam et al.

(10) Patent No.: US 12,079,256 B2
(45) Date of Patent: Sep. 3, 2024

(54) SEQUENCE PREDICTION FOR DATA RETRIEVAL

(71) Applicant: Capital One Services, LLC, McLean, VA (US)

(72) Inventors: Mohammadamin Dashti Moghaddam, McLean, VA (US); Fan Feng, McLean, VA (US); Illiana Reed, McLean, VA (US); Fedor Dzegilenko, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 191 days.

(21) Appl. No.: 17/560,710

(22) Filed: Dec. 23, 2021

(65) Prior Publication Data

US 2023/0205795 A1    Jun. 29, 2023

(51) Int. Cl.
*G06F 16/33* (2019.01)
*G06F 16/332* (2019.01)

(52) U.S. Cl.
CPC ...... *G06F 16/3325* (2019.01); *G06F 16/3338* (2019.01); *G06F 16/3347* (2019.01)

(58) Field of Classification Search
CPC ............. G06F 16/3347; G06F 16/3325; G06F 16/3338

USPC ......................................................... 707/759
See application file for complete search history.

(56) References Cited

U.S. PATENT DOCUMENTS

2016/0314200 A1*  10/2016  Markman ............. G06F 16/334
2020/0218722 A1*  7/2020   Mai ................... G06F 16/24522

* cited by examiner

*Primary Examiner* — Hosain T Alam
*Assistant Examiner* — Tracy M Mcghee
(74) *Attorney, Agent, or Firm* — Foley & Lardner LLP (57) ABSTRACT

A method includes obtaining an input sequence and first and second word sequences of metadata of a plurality of datasets. The method also includes determining a set of scores including first scores and second scores by determining first scores by determining a score of the first scores based on a count of the word sequence of the first word sequences in the metadata without determining a count of the input sequence. The method also includes determining second scores by determining a score of the second scores based on a count of a second sequence of the second word sequences in the metadata. The method also includes determining an additional word for a predicted sequence including the input sequence based on the set of scores and retrieving a set of datasets based on the predicted sequence.

20 Claims, 4 Drawing Sheets

SEQUENCE PREDICTION FOR DATA RETRIEVAL

BACKGROUND

Enterprise-scale data may be stored in various types of datasets and be relevant to users across a wide swath of domains. These datasets may serve multiple purposes far beyond their original intended use, forming the elements of a knowledge fabric that may persist for months, years, or even decades. Organizations may use a search engine search through the metadata associated with these datasets to retrieve datasets of interest. Advances in search engine operations may result in downstream benefits for a variety of applications.

SUMMARY

Searching through enterprise-scale data stored in datasets distributed through multiple databases and cataloged in different types of hierarchies specific to a domain may prove challenging. An organization may search through the different types of hierarchies using a search engine, where the search engine may assign scores to words to determine a set of datasets. A common requirement of search engine performance is the fast retrieval of data. Some search engines may use low computing-cost techniques such as TF-IDF to determine a set of datasets to satisfy this requirement. However, such methods may frequently be inadequate to deal with the sequential nature of a query, which may reduce the accuracy or overall usefulness of a retrieved set of datasets for a specific query. For example, a TF-IDF search may fail to register the difference between the query strings "enterprise devices health" and "health devices enterprise."

A computer system may obtain a query that includes an input sequence of words from a client computer device and generate a predicted sequence that is used to increase the accuracy of a search. Some embodiments may use the input sequence to generate a predicted sequence by using a set of probabilistic operations. The probabilistic operations may include using appearance counts of n-grams in dataset metadata to determine probability scores, where the n-grams may include some or all the words of the input sequence. Furthermore, some embodiments may reduce the number of operations during a search by not determining an appearance count of the input sequence or using a stored value in place of the input sequence appearance count. By using stored metadata associated with datasets to determine a predicted sequence, some embodiments may increase the accuracy that a predicted sequence will match a future user query.

After determining the appearance counts, some embodiments may compute weighted ratios of the appearance counts to predict probability scores for candidate words and select a word from the candidate words for use as an additional word. The additional word may then be combined with the input sequence to determine the predicted sequence. A computer system may then use the predicted sequence in a query for a set of databases to retrieve records based on the predicted sequence. By using the predicted sequence, some embodiments may reduce the number of irrelevant datasets in a search result without impairing the performance of database searches.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
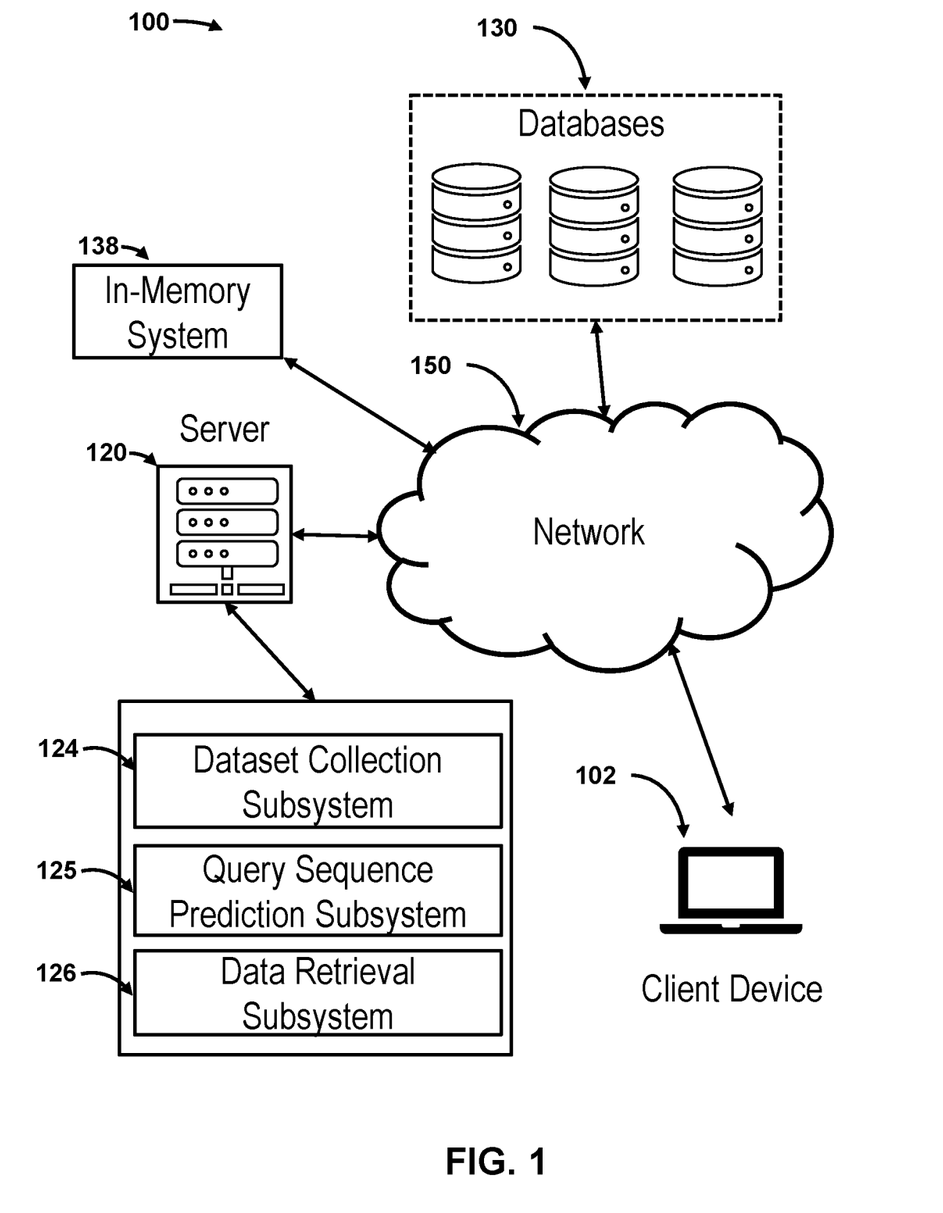
FIG. 1 shows an illustrative system for predicting a sequence for searching through dataset metadata, in accordance with one or more embodiments.

FIG. 1 shows an illustrative system for predicting a sequence for a search through dataset metadata, in accordance with one or more embodiments. A system 100 includes a client computer device 102. While shown a laptop computer, it should be noted that the client computer device 102 may include other types of computer devices such as a laptop computer, a desktop computer, a wearable headset, a smartwatch, another type of mobile computing device, etc. In some embodiments, the client computer device 102 may communicate with various other computer devices via a network 150, where the network 150 may include the Internet, a local area network, a peer-to-peer network, etc.

The client computer device 102 may send and receive messages through the network 150 to communicate with a server 120, where the server 120 may include non-transitory storage medium storing program instructions to perform one or more operations of subsystems 124-126. It should further be noted that, while one or more operations are described herein as being performed by particular components of the system 100, those operations may be performed by other components of the system 100 in some embodiments. For example, one or more operations described in this disclosure as being performed by the server 120 may instead be performed by the client computer device 102. Furthermore, although some embodiments are described herein with respect to probabilistic models, other prediction models (e.g., a machine learning model) may be used instead of or in addition to the probabilistic learning models. For example, a neural network model may be used to replace a probabilistic model in one or more embodiments to determine a probability score.

In some embodiments, the set of computer systems and subsystems illustrated in FIG. 1 may include one or more computer devices having or otherwise capable of accessing electronic storage, such as the set of databases 130. The set of databases 130 may include relational databases, such as a PostgreSQL™ database or MySQL database. Alternatively, or in addition, the set of databases 130 may include a non-relational database, such as a Cassandra™ database, MongoDB™ database, Redis database, Neo4j™ database, Amazon Neptune™ database, etc. Furthermore, some embodiments may communicate with an API of a third-party data service via the network 150 to obtain records of datasets or other data not stored in the set of databases 130 based on a query sent to the API. In addition, the client computer device 102 or the server 120 may access data stored in an in-memory system 138, where the in-memory system may include an in-memory data store that stores data in a key-value data store such as Redis™. Some embodiments may store queries or query results associated with the queries in an in-memory data store to accelerate data retrieval operations.

In some embodiments, a dataset may include one or more records, where each dataset may include multiple records that share the same set of fields. The dataset may include or otherwise be associated with a set of metadata, where the metadata may include dataset names, field names, a set of descriptors of the dataset as a whole, a set of descriptors for one or more specific fields of the dataset, etc. In some embodiments, the dataset may be visually depicted in a tabular form, such as in the form of a data table where the fields may be represented by columns and the records may be represented by rows. A record may include a set of attributes, where each attribute of the record may be associated with the record and be retrievable based on an identifier of the record. For example, a record may include a first attribute "12345678" for a first field "account value" and a second attribute "zb6958204" for a second field "record identifier."

In some embodiments, the client computer device 102 may send a query that includes an input sequence via a message, such as a web request conforming to an established communication protocol (e.g., Hyper Text Transfer Protocol (HTTP), HTTP Secure (HTTPS), etc.). For example, the client computer device 102 may send a query that includes an initial query string to the server 120. Some embodiments may then segment the initial query string into a set of tokens, where each token may be a phrase, a word, a sub-word, a character, etc. The input sequence may be an n-gram, where an n-gram may be a sequence of the tokens, and where "n" may represent the number of tokens in the n-gram. Furthermore, some embodiments may perform one or more text pre-processing operations. For example, some embodiments may determine words of the initial query string that match with words of a stopwords dictionary and remove each word from the initial query string that matches with any words of the stopwords dictionary. Some embodiments may then determine an input sequence based on the processed query string. Some embodiments may then use one or more of the operations described in this disclosure to generate a predicted sequence based on the input sequence and select a corresponding set of datasets based on the predicted sequence.

Subsystems 124-126

In some embodiments, the dataset collection subsystem 124 may retrieve a set of database identifiers or other information used to access a set of databases. For example, some embodiments may obtain session connection information for a first database, a second database, and a third database. Some embodiments may then perform operations to collect information regarding the metadata of different datasets, where the metadata may include dataset name, field names of the datasets, descriptors of the dataset, descriptors of the fields, etc. For example, some embodiments may collect the dataset name "D1_5r32," and the dataset descriptor includes a natural language text descriptor "this is a dataset for matter xqpp01." In some embodiments, the dataset metadata may be written in a structured format. Alternatively, or in addition, one or more elements of a dataset metadata may be written in natural language text, which may be more free-flowing and unstructured than text written in a structured format (e.g., a database query, computer program instructions, etc.).

Some embodiments may then determine a plurality of sets of n-grams of the metadata, where each set may be distinct with respect to the sequence of words or sub-words in the n-gram. For example, some embodiments may determine first word sequences and second word sequences of dataset metadata stored in corpora, where each sequence of the first word sequences have three words, and where each sequence of the second word sequences have four words. Furthermore, some embodiments may count the appearance of an n-gram in dataset metadata. For example, some embodiments may count a number of appearances of every bigram (i.e., 2-gram) in the metadata and associate the counts with their corresponding datasets. Some embodiments then count a number of appearances of every trigram (i.e., 3-gram) in the metadata and associate the counts with their corresponding datasets. As described elsewhere in this disclosure, in some embodiments, the counts of the bigrams, trigrams, or other n-grams may be collected into a set of collective n-grams to generate one or more predicted sequences. Some embodiments may collect the sets of n-grams in an n-grams table, where the n-grams table may include metadata, appearance counts of n-grams of the metadata text, identifiers associated with the metadata, or other values used in this disclosure.

After collecting the metadata of a dataset or a field of a dataset, some embodiments may perform operations on the metadata to increase the comprehensibility or usability of the metadata for one or more operations described in this disclosure. For example, some embodiments may perform rooting and lemmatization operations on the metadata. Furthermore, some embodiments may perform operations to generate a set of numeric scores based on the metadata. For example, some embodiments may generate a set of vectors based on words or sub-words of the metadata, where each word or sub-word may be associated with its own vector. Alternatively, or in addition, some embodiments may generate a vector based on a plurality of words. For example, some embodiments may generate a vector based on the entirety of a dataset descriptor. As described elsewhere in this disclosure, some embodiments may use a machine learning model to generate the vectors, where the machine learning model may be trained to generate vectors in a feature space.

In some embodiments, the query sequence prediction subsystem 125 may generate a predicted sequence based on an input sequence. For example, the input sequence may be obtained from the client computer device 102 via an HTTP web request, where the input sequence may be sent from the client device 102 the server 120 that is executing operations of the query sequence prediction subsystem 125. As described elsewhere in this disclosure, some embodiments may use a back off method to generate a predicted sequence based on the input sequence. For example, the query sequence prediction subsystem 125 may obtain a bigram (i.e., 2-gram) "blue test" as an input sequence. After receiving the bigram "blue test," some embodiments may then obtain a first count of the bigram "blue test" in the set of datasets. Furthermore, some embodiments may further obtain a second count of trigrams that begin with the bigram "blue test." Some embodiments may then determine that a subsequent word for the input sequence has a probability of being the terminal word of one of the trigrams. In some embodiments, the probability may be based on a determination that a value that correlates with the ratio of the second count to the first count.

As discussed elsewhere in this disclosure, some embodiments may obtain other n-grams that may be used to determine a subsequent word based on in input sequence. For example, some embodiments may determine a second set of n-grams with fewer words in each n-gram compared to the first set of n-grams. In some embodiments, the second set of n-grams may include a set of bigrams, where each bigram begins with the terminal word of an input sequence bigram and ends with a different word. For each respective bigram of the second set of bigrams, some embodiments may then count the number of appearances of the respective bigram of the second set of bigrams in the metadata text of a set of datasets. Some embodiments may then determine a subsequent word based on a ratio of the respective bigram of the second set of bigrams to the first bigram, where the subsequent word is the terminal word of the respective bigram. Furthermore, some embodiments may increase the contribution to the appearance count for datasets indicated to be frequently used by a user or group of users associated with a category.

In some embodiments, the data retrieval subsystem 126 may be used to obtain a set of records based on a subsequent word determined using one or more operations described in this disclosure. After determining a subsequent word for a bigram, some embodiments may combine the subsequent word with the bigram to form a trigram for use as a predicted sequence. Some embodiments may then search through a set of dataset metadata for the trigram sequence. Some embodiments may perform the search by determining a match between the trigram and metadata text. Furthermore, as described elsewhere in this disclosure, some embodiments may perform a semantic search by generating a semantic vector based on the trigram sequence using a machine learning model. In some embodiments, the same machine learning model may also have been used to generate a set of semantic vectors based on metadata associated with datasets. Some embodiments may then determine one or more dataset vectors that are within a predetermined distance to the semantic vector of the predicted sequence, where the predetermined distance is a distance in a feature space of the semantic vector. For example, some embodiments may determine a first semantic vector [10, 20, 30] based on a trigram and generate a second semantic vector [21, 32, 43] based on a dataset descriptor. Some embodiments may then determine a distance vector between the first and second semantic vectors to be [11, 12, 13] and thus determine that the distance in the feature space of the semantic vectors to be 20.83 (i.e., Sqrt[$11^2+12^2+13^2$]). Some embodiments may then determine whether the distance value 20.83 satisfies a distance threshold of 30.0 by being less than 30.0 and present a set of datasets associated with distance values that are less than the distance threshold. When causing a presentation of the datasets, some embodiments my Furthermore, some embodiments may perform the sequence prediction and data retrieval operations without receiving any additional queries from a user. For example, after receiving a first query from the client computer device 102 at the server 120, some embodiments may determine a predicted sequence based on the first query and retrieve a set of record values based on the predicted sequence while receiving no additional query from the client computer device 102.

In some embodiments, the data retrieval subsystem 126 may cache a set of retrieved records or record values in association with a previously-used predicted sequence, where the previously-used predicted sequence was used to retrieve the query results from an in-memory data store. Some embodiments may then receive another web message that causes the creation of another query that matches the first query and, in response, retrieve the query results from the in-memory data store. For example, some embodiments may determine that a query searching for a user identifier was already performed based on a history of previously sent queries stored in a database. In response, the data retrieval subsystem 126 may retrieve a set of records, record values, or other query results stored in association with the previously sent query from an in-memory data store without retrieving the record from databases that originally stored the set of records. For example, some embodiments store, retrieve, update, or delete values on a cloud-based in-memory data store running on Amazon Elasticache™.

Figure 2:
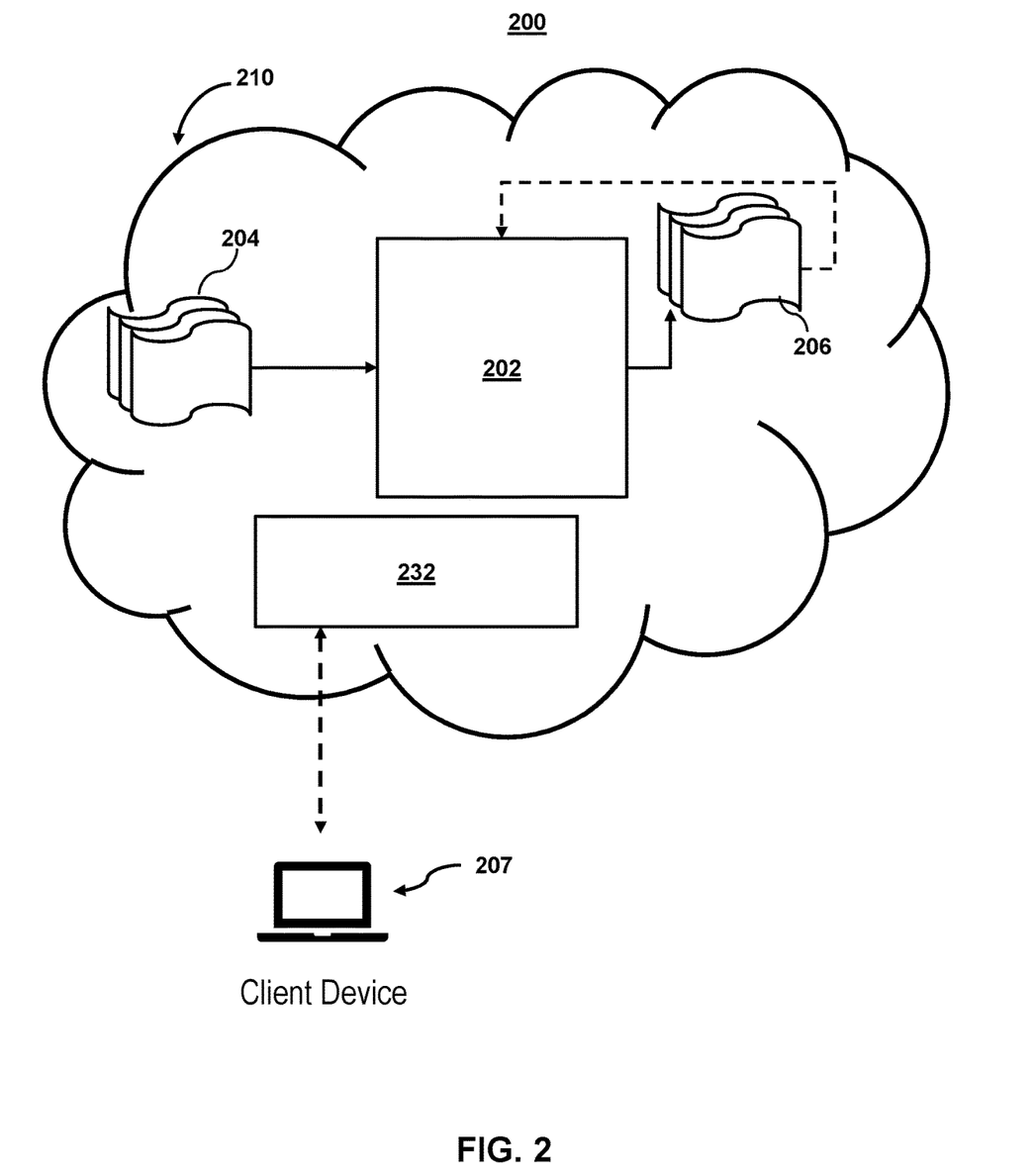
FIG. 2 shows an illustrative diagram of a system for predicting a sequence, in accordance with one or more embodiments.

FIG. 2 shows an illustrative diagram of a system for predicting a sequence, in accordance with one or more embodiments. A system 200 may include computer device 207, where the computer device 207 may be any computer device, including, but not limited to, a smartphone, a laptop computer, etc. FIG. 2 also includes cloud system 210 implemented on a distributed computer system, where the cloud system 210 may include any computing device described in this disclosure or any other type of mobile computer device, fixed computer device, or other computer device. In some embodiments, the distributed computer system may include a set of computing nodes such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computer device 102, the server 120, the network 150, or the set of databases 130. For example, the set of databases 130 may each be controlled by different computing nodes of the set of computing nodes, and a query received by the set of databases 130 may cause each node of the set of computing nodes to perform a search based on the query.

In some embodiments, the cloud system 210 may include a machine learning model 202. The machine learning model 202 may take inputs 204 and provide outputs 206. The inputs may include multiple datasets, such as a training dataset and a test dataset. Each dataset of the multiple datasets (e.g., inputs 204) may include data subsets related to dataset metadata, such as dataset names, dataset descriptors, field names, field descriptors, etc. In some embodiments, outputs 206 may be fed back to the machine learning model 202 as input to train the machine learning model 202 (e.g., alone or in conjunction with user indications of the accuracy of outputs 206, reference semantic vectors, or other reference feedback information). In some embodiments, machine learning model 202 may include an artificial neural network. In such embodiments, machine learning model 202 may include an input layer and one or more hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiments, machine learning model 202 may update its configurations (e.g., weights, biases, or other parameters) based on the outputs 206 and reference feedback information (e.g., user indication of accuracy, reference vectors, or other information). In some embodiments, such as where machine learning model 202 is a neural network, connection weights may be adjusted to reconcile differences between the neural network's prediction and reference feedback. For example, an output layer of the machine learning model 202 may correspond to a category and a field identifier or field descriptor known to correspond to that classification may be provided to an input layer of the machine learning model 202 during training.

In some embodiments, machine learning model 202 may include multiple layers (e.g., where a signal path traverses from front layers to back layers). In some embodiments, the machine learning model 202 may use backpropagation techniques, where forward stimulation is used to reset weights on the "front" neural units. For example, one or more neurons (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition operations for the machine learning model 202 may be more free-flowing, with connections interacting in a more chaotic and complex fashion.

In some embodiments, the system 200 may include an API. In some embodiments, the API layer 232 may reside on one or more components of the cloud system 210. Alternatively, or additionally, the API layer 232 or a portion of the API layer 232 may be implemented on the computer device 207. The system 200 may be partially based on API layer 232 such that there is strong adoption of representational state transfer (REST)ful web-services or simple object access protocol (SOAP) web services. Alternatively, system 200 may be fully based on the API layer 232, such that separation of concerns between layers like API layer 232, services, and applications are in place.

In some embodiments, the system architecture of the system 200 may use a microservice approach. For example, some embodiments may include a Front-End Layer and a Back-End Layer where microservices reside. In such an architecture, the API layer 232 may include a middleware component to provide integration between Front-End and Back-End Layers, where the API performs one or more operations described in this disclosure. For example, a middleware component of the API layer 232 may receive an initial query string from the computer device 207 and generate a predicted sequence based on the initial query string. The API layer 232 may use one or more types of communication systems, such as RESTful APIs, an advanced message queuing protocol (e.g., Kafka, RabbitMQ, etc.), gRPC, etc.

Figure 3:
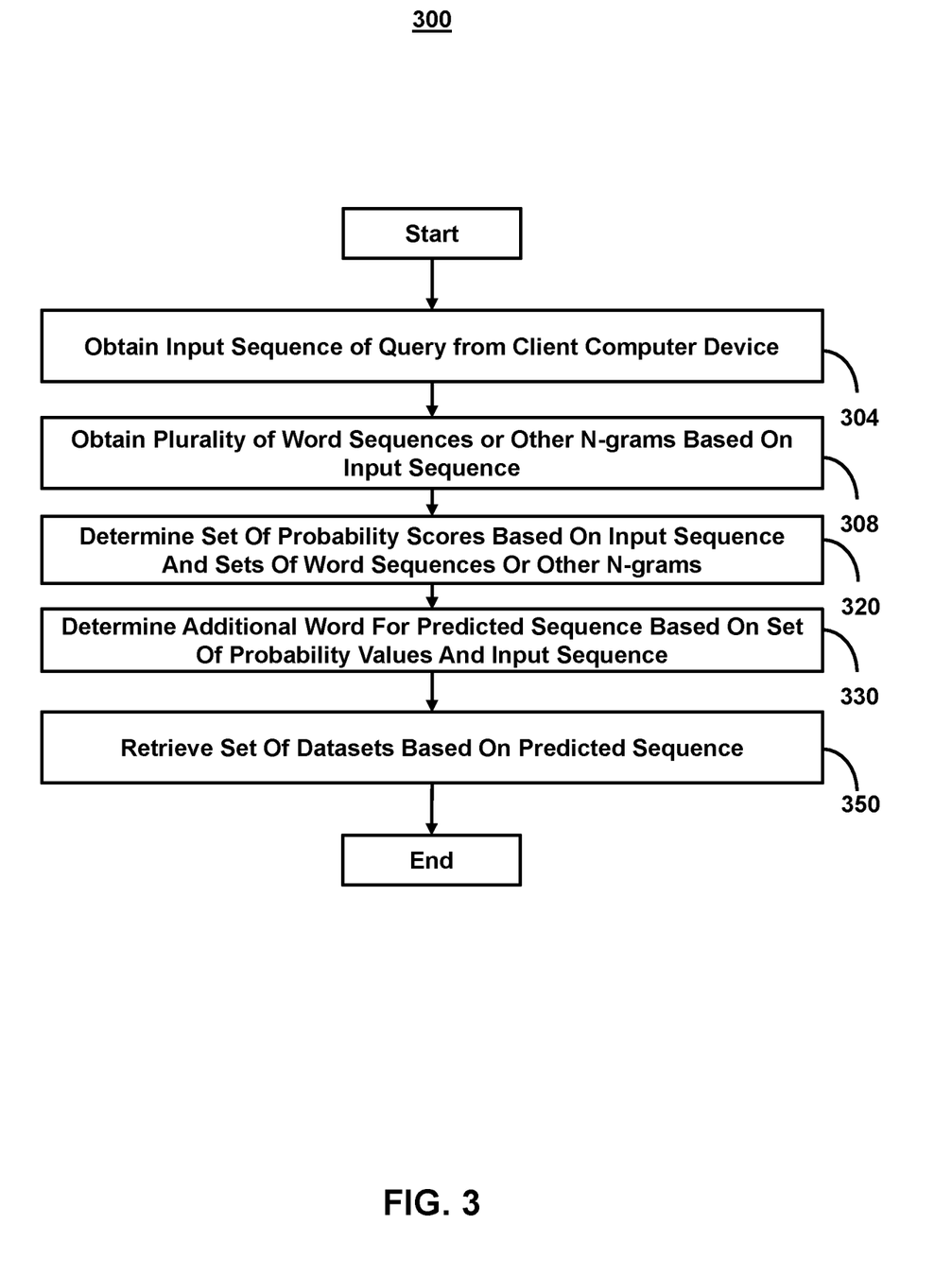
FIG. 3 shows a flowchart of a process to predict a word sequence based on an input sequence, in accordance with one or more embodiments.

FIG. 3 shows a flowchart of a process to predict a word sequence based on an input sequence, in accordance with one or more embodiments. Operations of the process 300 may begin at block 304. Some embodiments may obtain an input sequence of a query from a client computer device, as indicated by block 304. In some embodiments, a query including a sequence of words ("query word sequence") written in natural language text form may be received from a client computer device, where the sequence of words may include the input sequence, where the input sequence may include an n-gram. For example, some embodiments may receive a query that includes the query word sequence, "dataset mobile tech applicat." The query word sequence may be provided by a user who has typed the natural language text into a UI element such as a search bar. As discussed elsewhere in this disclosure, the query word sequence may then be processed to obtain an input sequence, such as the trigrams "dataset mobile tech" and "mobile tech applicat." Alternatively, or in addition, the natural language text may be provided from an application program interface obtained from an application, a voice-to-text program, etc.

In some embodiments, the query may be provided in association with a user identifier. For example, a user may be logged into an application of the client computer device during a data session between the client computer device and a server performing one or more operations described in this disclosure. In some embodiments, being logged in may include associating one or more messages sent between the server and the client computer device with a user identifier indicating that the user is providing or receiving messages. The user identifier may then be used to determine information related to one or more domain categories assigned to the user, such as a role, security group, permission level, domain knowledge expertise, department, or the like. Some embodiments may use the domain categories to modify the selection of one or more parameters used to predict a bigram, trigram, or some other n-gram.

In some embodiments, a query may be obtained in the form of a structured query, where one or more parameters of the structured query may be a sequence of words that can be used as an input sequence. For example, some embodiments may receive a text written in the form of a structured SQL query, where the structured SQL query may include text such as, "SELECT * WHERE CHARINDEX('word01 word02 word03', Column1)>0." Some embodiments may then perform a pattern matching operation to isolate and collect an input sequence such as the trigram 'word01 word02 word03' from the structured query for use as an input sequence.

In some embodiments, the text provided with a query may be segmented and processed to determine one or more input sequences. Some embodiments may perform text pre-processing operations such as lemmatization, rooting, stopword removal, or the like. For example, some embodiments may remove the stopwords "a," "to," or "the" from a text sequence. After pre-processing operations, some embodiments may collect a set of input sequences by selecting an initial set of words or a final set of words. For example, some embodiments may receive the query sequence "data sourc vehic learn operation" and extract the first input sequence "data sourc" and the second input sequence "learn operation." Alternatively, or in addition, the text provided with a query may be compared with words or phrases from a set of known words or phrases to determine the presence of one or more recognized words or terms. For example, the query sequence may be compared with a dictionary of terminology that recognizes the bigram "vehic learn." In response to a determination that the bigram "vehic learn" is present in the query sequence, some embodiments may use the bigram as an input sequence for one or more operations described in this disclosure. Furthermore, some embodiments may reverse an input sequence. For example, some embodiments may select the bigram "sourc vehic" as an input sequence and then reverse the input sequence into reversed pair of words "vehic sourc." Some embodiments may account for user error or variations in terminology for a description by reversing the input sequence. Some embodiments may then determine a subsequent word for the reversed pair of words "vehic sourc." Furthermore, after reversing the input sequence and determining an additional word based on the reversed input sequence, some embodiments may re-reverse the reversed input sequence to use the additional word as the starting word of a predicted sequence.

Some embodiments may receive the query and its associated natural language text via an API layer. For example, a client computer device may provide a web request to an API during a data session, where the web request may include natural language text for a query, and where the web request is associated with a user identifier. After receiving the web request at an API, some embodiments may include one or more components acting as middleware between the client computer device and a downstream search application hosted on an on-site server or a computing node of a cloud computing service. Furthermore, some embodiments may perform operations to determine a predicted sequence based on an input sequence and operations to use the predicted sequence to perform a search.

Some embodiments may obtain a plurality of word sequences or other n-grams based on the input sequence, as indicated by block 308. Some embodiments may obtain a sequence of n-grams such as trigrams, bigrams, four-grams, etc. in response to receiving an input sequence. As discussed elsewhere in this disclosure, some embodiments may obtain a plurality of n-grams that include an input sequence. For example, some embodiments may obtain a plurality of n-gram sequences from an n-grams table, where the records of the n-grams table may have been obtained from the metadata of a plurality of datasets. After obtaining an input sequence, some embodiments may search through the n-grams table for one or more n-grams that include the input sequence. After determining that an n-gram of the n-grams table matches with an input sequence, some embodiments may store an identifier of the n-gram in a temporary collection of n-grams or otherwise obtain the n-gram for later collection. For example, after receiving the input sequence "bifurc reason," some embodiments may obtain a plurality of trigrams or other n-grams that includes the input sequence "bifurc reason," such as the trigram, "bifurc reason ocean," "bifurc reason blu," and the trigram "bifurc reason machin."

Some embodiments may filter the data stored in an n-grams table before using the data to count the number of appearances of an n-gram. In some embodiments, the data in the n-grams table may be filtered based on a user record or category assigned to the user record. For example, some embodiments may identify a second set of datasets available to or others associated with a category assigned to a user record. Some embodiments may then update an n-grams table based on an initial state of the n-grams table and the second set of datasets to reduce the possibility that a user will be provided with query results that include datasets they cannot access. For example, some embodiments may filter the data of an initial state of an n-grams table to include only data associated with the second set of datasets.

Some embodiments may obtain multiple sets of n-grams. For example, after obtaining a first set of n-grams, some embodiments may obtain a second set of n-grams, where each n-gram of the second set of n-grams may have fewer words or sub-words then the n-grams of the first set of n-grams. For example, some embodiments may obtain a first set of n-grams that includes a plurality of trigrams. Some embodiments may then obtain a second set of n-grams, where each n-gram is a bigram. In some embodiments, the second set of n-grams may include a plurality of n-grams that include one word of the input sequence but not another word of the n-gram sequence. For example, some embodiments may obtain the input sequence "vehic accident" and a set of bigrams that begin with the word "accident." Furthermore, some embodiments may obtain three or more sets of n-grams, where each set of the three or more sets of n-grams may each have n-grams of different sizes. As discussed elsewhere in this disclosure, each n-gram of the three or more sets of n-grams may include at least one word from the input sequence. As described elsewhere in this disclosure, some embodiments perform iterative back-off operations to determine the probability of a word.

As described elsewhere in this disclosure, a dataset may include metadata associated with the dataset itself or associated with a field of the metadata. For example, a dataset may include a first descriptor written in natural language text that characterizes properties of the dataset as a whole, and intent of the dataset as a whole, an origin of the dataset as a whole, a set of applications used to provide data for the dataset, a set of applications that use the data stored in the dataset, etc. Similarly, a dataset may include or be associated with a set of field descriptors, where each field descriptor may describe a specific field of the first dataset or a second dataset. Some embodiments may use both types of datasets and further retrieve identifiers for both the dataset and the fields of the dataset, where both may be as results of a search query. In cases where a field is presented as a search query result, the dataset comprising the field may also be provided in the results.

Some embodiments may determine a set of probability scores based on the input sequence and the sets of word sequences or other n-grams, as described by block 320. Determining a set of probability scores may include counting the appearances of n-grams in dataset metadata. For example, if the trigram "blue radish phase" appears in dataset metadata three times, the appearance count of the trigram "blue radish phase" may be equal to three. In some embodiments, the count for each obtained n-gram may be stored in a set of values. For example, a record of an n-grams table may include an n-gram, the metadata or other data sources in which the n-gram appeared, and the count of appearances that the n-gram made in each respective metadata or other data source. For example, an n-grams table may include a record for the n-gram "direc command unit" and a set of dataset names having metadata that, after a set of pre-processing operations, includes the n-gram "direc command unit."

Some embodiments may account for a count of appearances for each n-gram of the set of n-grams by using probabilistic language model, such as a Katz back-off model. For example, some embodiments may determine the probability score for a candidate word for a first n-gram based on a set of n-grams that start with the first n-gram or includes at least a portion of the first n-gram, where the candidate word is a terminal word of the set of n-grams. A computer system may perform various types of operations to determine a value based on these n-grams. For example, some embodiments may perform a first set of operations over a plurality of n-grams in an n-grams table. During this first set of operations, some embodiments may determine a ratio of a first count relative to a second count, where the first count may represent an appearance count of an n-gram in the metadata of a set of datasets, and where the second count may represent an appearance count of the input sequence in the metadata of the set of datasets. For example, some embodiments may obtain a first appearance count of an input sequence "delinque account," obtain a second appearance count of the trigram "delinque account active," and determine a ratio of the first appearance count and the second appearance count. By using a ratio that uses the appearance count of trigrams, bigrams, or other n-grams relative to an input sequence, some embodiments may increase the accuracy of a prediction for a candidate word of the input sequence based on probability principles.

Some embodiments may perform this first set of operations without determining an appearance count of the input sequence. For example, some embodiments may receive a bigram as the input sequence "delinque account" and use the input sequence to select a set of trigrams that start with the input sequence "delinque account," such as "delinque account alpha" and "delinque account beta." Some embodiments may then determine the probability of the candidate word being "alpha" based on the appearance count of the trigram "delinque account alpha." Similarly, some embodiments may determine the probability of the candidate word being "beta" based on the appearance of the trigram "delinque account beta." Some embodiments may perform operations such as using a constant to scale each appearance count instead of dividing by an appearance count of the input sequence. For example, some embodiments may multiply the appearance count of the trigram "delinque account alpha" by a weight parameter without dividing the appearance count of the trigram "delinque account alpha" by an appearance count of the bigram "delinque account." Alternatively, some embodiments may use previously-computed appearance counts of an input sequence instead of re-determining an appearance count of the input sequence after receiving the input sequence in a new query. For example, instead of determining a ratio for the candidate word "loq" based on a ratio of a newly-computed appearance count for the trigram "blue red loq" and a newly-computed appearance count for the bigram "blue red," some embodiments may retrieve a previously-stored appearance count for the bigram "blue red." Some embodiments may then determine a ratio for the candidate word "loq" based on a ratio of the newly-computed appearance count for the trigram "blue red loq" and a previously-stored appearance count for the bigram "blue red." As described elsewhere, some embodiments may then determine a final or intermediate probability score for the candidate word "loq."

As described elsewhere in this disclosure, some embodiments performing the first set of operations may multiply a ratio of appearance counts by a first weight parameter. In some embodiments, the first weight parameter may be specific to the input sequence, where the first weight parameter may be selected from a first plurality of weights stored in a search parameter record. For example, based on a determination that the input sequence is equal to the string "blue rock," some embodiments may retrieve a weight parameter from a search parameter record associated with the input sequence. Alternatively, or in addition, some embodiments may retrieve a weight parameter as a default value. For example, some embodiments may retrieve and use the same weight parameter when determining a probability score for a candidate word based on an appearance count of an n-gram including the candidate word.

Some embodiments may retrieve a weight parameter based on a category associated with a user record. For example, a first set of users may be associated with the category "type1," and a second set of users may be associated with the category "type2." Some embodiments may select a first search parameter record to retrieve a first weight parameter based on the category "type1" and select a second search parameter record to retrieve a second weight parameter based on the category "type2." Furthermore, some embodiments may modify the appearance counts associated with different user records. For example, before determining a total appearance count of an n-gram, some embodiments may update an n-grams table having an initial state to include only the metadata of datasets available to a user. As used in this disclosure, a total appearance count of an n-gram may be a count of all appearances of the n-gram in a corpora, such as a corpora of metadata text. Some embodiments may then determine an appearance count of an n-gram based on the updated n-grams table.

As described above, some embodiments may use an input sequence and an n-gram having a number of words or sub-words greater than the words or sub-words of the input sequence to determine a probability score associated with the n-gram. Some embodiments may use this probability score as an intermediate probability score, where the intermediate probability score is associated with a candidate word sequence equal to or otherwise based on the n-gram. In some embodiments, performing the first set of operations may include determining whether the intermediate probability score or an appearance count used to determine the intermediate probability score satisfies a threshold. In some embodiments, the threshold may be equal to zero. Alternatively, the threshold may be equal to a non-zero value, such as 0.01, 0.02, or some other number. In some embodiments, the intermediate probability score may satisfy the threshold by having a probability score that is greater than or equal to the threshold. After determining that a probability score satisfies the threshold, some embodiments may assign the probability for a candidate word to be equal to the intermediate probability score. In response to a determination that the threshold is not satisfied by the intermediate probability score, some embodiments performing the first set of operations may determine a second probability score to associate with a candidate word. For example, some embodiments may back off the initial word or sub-word of the input sequence and use an n-gram having the input sequence without the initial word or sub-word of the input sequence to determine a probability. For example, if the threshold is equal to 0.05 (i.e., 5%), and an intermediate probability score for a word is equal to 0.049 (i.e., 4.9%), some embodiments may determine that the threshold is not satisfied. Alternatively, or in addition, some embodiments may determine whether an appearance count of a candidate word sequence satisfies an appearance count threshold. For example, some embodiments may determine that an appearance count "1" is less than an appearance count threshold "3," and, in response, determine a second ratio and corresponding second candidate probability score, as described further below.

In response to a determination that the threshold is not satisfied, some embodiments may determine a second ratio based on an appearance count of an n-gram of the second set of n-grams ending with the candidate word. For example, based on a determination that a trigram that terminates in a candidate word has an appearance count less than a threshold, some embodiments may determine the appearance count of a bigram that ends in the candidate word, where the bigram is selected from a set bigrams that each include a second word of an input sequence without the first word of the input sequence. Some embodiments may then use the appearance count of the bigram to determine a probability score by using the first set of operations described above. For example, some embodiments may first determine a backed-off ratio, where the backed-off ratio is a ratio of the appearance count of the bigram ending in the candidate word and the appearance count of the input sequence without the initial word of the input sequence.

After determining the backed-off ratio, some embodiments may multiply the backed-off ratio by a second weight parameter to determine a candidate second probability score. In some embodiments, the second weight parameter may be determined based on the first weight parameter. For example, the second weight parameter may be equal to a ratio of a first value to a second value, where the first value may be equal to a left over probability mass for a backed-off input sequence, where the probability mass may be the complement of a sum of ratios multiplied by the first weight value, where each ratio of the first sum of ratios is a ratio of an appearance count for n-gram sequences having a candidate word and the input sequence and an appearance count of the input sequence for n-gram sequences that have an appearance count greater than the threshold. Furthermore, in some embodiments, the second value may be equal to or otherwise based on a sum of the probability scores computed for a third set of n-gram sequences associated with appearance counts less than the threshold, where each n-gram sequence the third set of n-gram sequences includes the input sequence or, upon a backed-off iteration, a backed-off iteration of the n-gram sequence.

Some embodiments may determine whether a count of the backed-off input sequence satisfies the threshold. In response to a determination that the backed-off input sequence satisfies the threshold, some embodiments may use the candidate second score as a probability score associated with the candidate word. Alternatively, some embodiments may iteratively back off the input sequence again and perform one or more operations of the first set of operations described above. In each iteration, the input sequence may be further backed off ("back off iteration"), which shortens the input sequence for consideration.

Some embodiments may prematurely terminate a back off iteration. For example, some embodiments may determine that an appearance count of an n-gram ending in a candidate word does not satisfy a threshold without determining the count of a lower-word-count n-gram. Some embodiments may use the intermediate probability score as the probability score for the candidate word. Alternatively, some embodiments may set the probability score for the candidate word to be equal to zero.

Some embodiments may modify the weight parameter of a probability score based on a stored set of queries representing a history of previous searches. For example, some embodiments may increase the probability score for the trigram "red red blue" based on a determination that the most recent queries that begin with the bigram "red red" in with the word "blue." In some embodiments, the increase in the probability of a trigram or other n-grams may be proportional with the ratio that the trigram or other n-gram is used in a history of previous searches. Various schemes may be implemented to account for a history of searches, such as using a maximum increase factor that is then scaled by using n-grams in the history of previous searches. For example, some embodiments may have a maximum increase factor of 50%, where the probability associated with a specific trigram relative to others may be increased by up to 50%. Some embodiments may determine that a history of previous search queries indicates that a first trigram was used 80% of the time and that a second trigram was used 20% of the time. Some embodiments may then multiply the probability associated with the first trigram by the maximum increase factor and the use ratio of 80%. Additionally, some embodiments may then multiply the probability associated with the second trigram by the maximum increase factor and the use ratio of 20%. Some embodiments may then re-normalize the probability scores such that the total probability mass of all possible listed candidate words is equal to one.

Some embodiments may determine an additional word for a predicted sequence based on the set of probability scores and the input sequence, as indicated by block 330. Some embodiments may select an additional word for a predicted sequence based on the candidate word having the greatest probability. In some embodiments, the additional word may be a subsequent word of a word sequence. For example, if a first word "word1" is a candidate word associated with a probability score 75% and a second word "word2" is a candidate word associated with the probability score 25%, some embodiments, some embodiments may select "word1" as a subsequent word for a predicted sequence of words. Alternatively, some embodiments may position an additional word before an input n-gram. Furthermore, while some embodiments may determine the terminal word of a predicted sequence, some embodiments may determine a starting word for a predicted sequence instead. For example, some embodiments may reverse an input sequence and then perform operations described elsewhere in this disclosure based on the reversed input sequence to obtain an additional word. Some embodiments may then append the additional word to the reversed input sequence and then reverse the generated sequence to use the reversed generated sequence as a predicted sequence.

Some embodiments may modify an initial set of probability scores associated with a set of candidate words. For example, some embodiments may update a weight parameter associated with a specific dataset. Some embodiments may determine that a user or group of users frequently access a specific dataset. Some embodiments may then update a third weight parameter associated with n-grams found in the metadata of the specific dataset to increase the probability score for candidate words or candidate word sequences generated based on the metadata of the specific dataset. For example, some embodiments may increase an appearance count during computation of the appearance count by a weighting parameter when a counting operation adds an n-gram appearance from the specific dataset to the appearance count.

Some embodiments may determine a predicted sequence based on a randomly or pseudo-randomly determined value. For example, some embodiments may use a random value determined from a physical measurement or a random value determined using a pseudorandom algorithm such as a linear congruential generator. Some embodiments may then use the random value to determine a predicted sequence for a search. For example, some embodiments may use the probability scores determined using operations associated with block 320 to generate a set of bins defined by different value ranges. Some embodiments may then determine a selection value based on a random or pseudorandom operation and determine a value range that the selection value falls within, where the value range is associated with a candidate word. Some embodiments may then use the candidate word as a subsequent word of a prediction sequence. By determining a random or pseudorandom operation to determine a selection value that is then used to select a range of a set of value ranges, some embodiments may increase the likelihood that a less-used additional word will be used for a predicted sequence.

Some embodiments may determine a plurality of predicted sequences and use one or more of the plurality of predicted sequences for queries that may execute concurrently. For example, some embodiments may predict a first predicted sequence "word1 word2 word3" and a second predicted sequence "word1 word2 word4." Some embodiments may then perform a first search based on the first predicted sequence concurrently with a second search based on the second predicted sequence.

Some embodiments may retrieve a set of datasets based on the predicted sequence, as indicated by block 350. Some embodiments may access a set of databases to obtain a set of datasets. These databases may include various types of databases, such as SQL databases, graph databases, key-value databases, etc. After accessing a database, some embodiments may then retrieve a dataset from the database, where retrieving the dataset may include retrieving an identifier of the dataset, retrieving one or more records of the dataset, retrieving one or more field identifiers of the dataset, retrieving one or more attributes of the dataset, etc.

In some embodiments, retrieving datasets may include searching through a set of databases for the set of datasets. Some embodiments may use multi-threading to concurrently search through the set of databases storing the set of datasets. For example, after generating a query based on a predicted sequence, some embodiments may execute multiple threads to perform a set of parallelized searches through the database. By using multi-threading, some embodiments may increase search efficiency and expand the total number of potentially-relevant results.

Some embodiments may retrieve a dataset based on the predicted sequence based on a determination that the predicted sequence is found within a natural language text descriptor of the dataset. For example, if a predicted sequence includes the phrase "blu moal bel" and a first dataset descriptor or a processed version of the first dataset descriptor includes the phrase "blu moal bel," some embodiments may retrieve the first dataset. Alternatively, or in addition, some embodiments may retrieve a dataset based on the predicted sequence in response to a determination that the predicted sequence is found within a text descriptor of a field of the dataset. For example, some embodiments may determine that a predicted sequence that includes the phrase "Val Cole Parr" is found in the written text descriptor for a first field of a first dataset. Some embodiments may then retrieve the first dataset from data storage in response to a search based on the predicted sequence.

Some embodiments may perform additional semantic similarity operations to retrieve one or more datasets or other types of search results. For example, some embodiments may use a neural network to generate a first semantic vector based on a predicted sequence. Some embodiments may then compare the first semantic vector with semantic vectors stored in association with datasets or field the datasets. Some embodiments may determine whether a distance between the first semantic vector and another semantic vector is within a distance threshold, where the distance threshold may a distance in a feature space of the semantic vector, and where the other semantic vector may be based on metadata text of a candidate dataset. In response to a determination that the distance between the first semantic vector and other semantic vector is within the distance threshold, some embodiments may present the candidate dataset.

Some embodiments may rank or otherwise sort the query results of a query based on the predicted sequence. The order of the sorted query results may be based on a relevancy score, a domain value associated with a search result, etc. For example, some embodiments may determine a plurality of vectors or another plurality of scores based on the dataset metadata of the retrieved datasets using a neural network. The score may be determined in various ways. For example, some embodiments may use an encoder-decoder neural network to determine a first vector based on an initial query string of a query provided by a client computer device. Some embodiments may use the same encoder-decoder neural network to determine a plurality of vectors based on the text descriptors of a plurality of retrieved datasets, where each vector is determined from a different descriptor of the text descriptors. As used in this disclosure, an encoder-decoder neural network is a neural network that may be used to convert an input sequence into a fixed-length representation, where the fixed-length representation may be a set of Boolean values, a set of categories, a vector, etc. Some embodiments may then determine a distance in the feature space of the vectors for each pair of a plurality of vector pairs, where each pair of the plurality of vector pairs includes the first vector and a different vector from the plurality of vectors. Some embodiments may then rank the order in which the retrieved datasets are displayed based on their corresponding distances. For example, some embodiments may display a first dataset having a lesser distance before or above a second dataset having a greater distance.

Some embodiments may perform training operations to update one or more weight parameters. In some embodiments, updating a weight parameter may include changing the numeric values of a set of weight parameters based on a search performance. For example, some embodiments may obtain a measurement of a first elapsed time and determine a search performance based on the first elapsed time. The first elapsed time may indicate a duration that starts when a client computer device provides an input sequence used to determine the first additional word to generate a predicted sequence of a query and ends when a first set of records is provided to the client computer device based on the query.

Some embodiments may then perform a concurrent search or a later search after modifying the numeric values of one or more weights described in this disclosure to determine a second elapsed time. For example, some embodiments may modify a first weight that is used to determine a third set of probability scores based on a set of trigrams. Furthermore, modifying the first weight to a candidate first weight may cause the downstream modification of a second weight to a candidate second weight, where the second weight may be used to determine a fourth set of probability scores based on a set of bigrams. Some embodiments may then predict a second additional word based on the third and fourth set of probabilities to determine a second predicted sequence for a query. Some embodiments may then determine a second elapsed time that ends when a set of records is provided to the client computer device in response to the query based on the candidate first and second weights. In cases of a concurrent search, the starting time of the second elapsed time may be the same as the starting time of the first elapsed time starts. In the case of a later search, the second elapsed time may start when the input sequence of the later search is received from a client computer device. Some embodiments may then determine a performance score based on a difference between the first and second elapsed time, where the performance score may also be based on differences in accuracy, a user-provided feedback score, a result count, etc. Some embodiments may then determine whether to change the weights to their corresponding candidate weights, restore the weights to their previous values, or further modify the weights based on the performance score.

Figure 4:
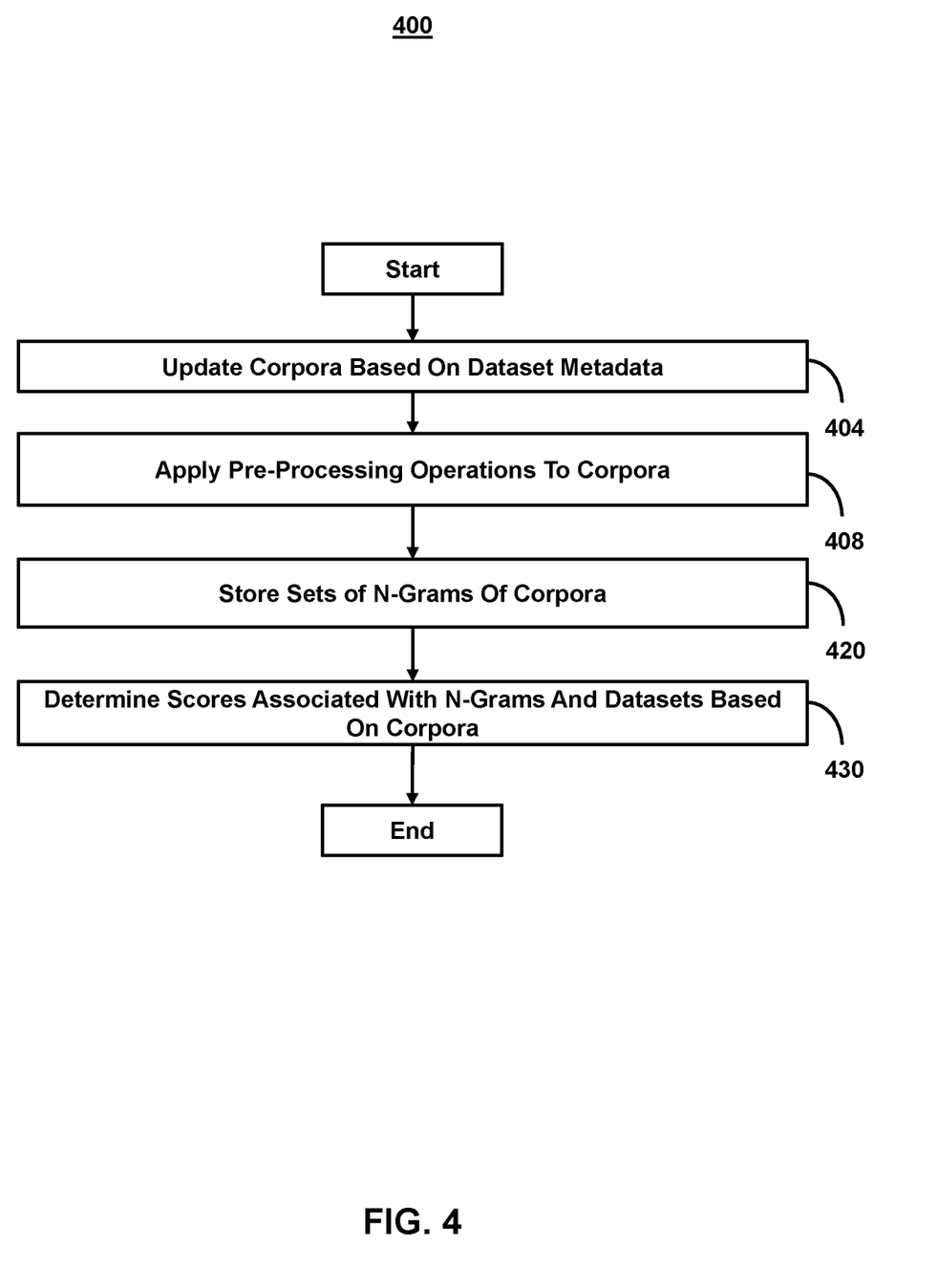
FIG. 4 shows a flowchart of a process to optimize a collection of datasets for sequence prediction, in accordance with one or more embodiments.

FIG. 4 shows a flowchart of a process to optimize a collection of datasets for sequence prediction, in accordance with one or more embodiments. Operations of the process 400 may begin at block 404. Some embodiments may include updating a corpora or other collection of text data based on the dataset metadata, as indicated by block 404. As described elsewhere in this disclosure, some embodiments may search through each respective dataset of a plurality of datasets and add the respective metadata of the respective dataset to the corpora. The metadata of a dataset may include dataset names, dataset descriptors (e.g., natural language text descriptors), field names, field descriptors, etc. For example, some embodiments may obtain a dataset having the identifier "x0942" with a dataset name "customer_2k1_2k2", a dataset descriptor "includes customer information and their previous purchases." Some embodiments may then add the dataset metadata to the corpora. In some embodiments, each document of the corpora may be indexed by the identifier and may include the dataset metadata. Alternatively, or in addition, some embodiments may store field identifiers or field descriptors of a dataset in the corpora in association with the identifier of the dataset.

The corpora may be stored in various ways. For example, some embodiments may store the corpora in an unstructured or semi-structured format, such as by storing the metadata in a set of JSON documents. Alternatively, or in addition, some embodiments may store the corpora in a structured format, such as in the form of an n-grams table. For example, some embodiments may store metadata text in an n-grams table.

Some embodiments may apply a set of pre-processing operations to the corpora, as indicated by block 408. In some embodiments, where the set of pre-processing operations may include lemmatizing the text of the corpora, removing the stopwords of the text of the corpora, etc. Some embodiments may perform text pre-processing operations similar to or the same as those described for block 304. By performing the same set of text pre-processing operations on both a query sequence from a client computer device and metadata text, some embodiments may increase the likelihood of retrieving accurate results in a search operation.

Some embodiments may store one or more sets of n-grams of the corpora, as indicated by block 420. As described elsewhere in this disclosure, some embodiments may determine each unique set of n-grams, where an n-gram may represent different sequences of tokens. For example, the sequence of words "blue red black" may be used as a n-gram, where n=3. Some embodiments may count the occurrence of n-grams for each document or component of a document. For example, if a dataset descriptor includes the natural language text "blue with red with blue with red," some embodiments may determine that the bigrams of the dataset descriptor include "blue with," "with red," "red with," and "with blue." Some embodiments may then count the occurrence of "blue with" in the dataset descriptor and associate the count value "2" with the bigram "blue with." Furthermore, some embodiments may determine multiple sets of n-grams, where the n-grams of each set of n-grams may have a same "n" value. For example, some embodiments may determine a set of bigrams and a set of trigrams based on the metadata text stored in the corpora.

After collecting the sets of n-grams, some embodiments may store the set of n-grams in an n-grams table. The n-grams of the n-grams table may be indexed to permit fast retrieval of count values associated with the n-gram. In some embodiments, a total appearance count for an n-gram may be stored in association with the n-gram in the n-gram table, where the total appearance count is equal to or otherwise based on the number of times that the n-gram appears in the corpora. Alternatively, or in addition, as described elsewhere in this disclosure, some embodiments may dynamically sum the appearance counts of the n-gram of different metadata text associated with different datasets to obtain a total appearance count.

Some embodiments may determine scores associated with n-grams and datasets based on the corpora, as indicated by block 430. For example, some embodiments may determine a set of semantic vectors using a neural network, such as a feed-forward neural network or a more complex neural network. For example, some embodiments may use an encoder-decoder neural network to determine a vector based on an n-gram, and then store the vector in association with the value. Furthermore, some embodiments may use the neural network or a different neural network to determine a semantic score for a dataset such as a vector based on a natural language text field descriptor, a natural language text dataset descriptor, or another metadata associated with the dataset. Some embodiments may then store the semantic score in association with the dataset in the n-grams table.

The operations of each method presented in this disclosure are intended to be illustrative and non-limiting. It is contemplated that the operations or descriptions of FIG. 3 or FIG. 4 may be used with any other embodiment of this disclosure. In addition, the operations and descriptions described in relation to FIG. 3 or FIG. 4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIGS. 3-4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network 150 may include one or more communications paths, such as Eethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-126 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-126 described herein is for illustrative purposes, and is not intended to be limiting, as any of subsystems 124-125 may provide more or less functionality than is described. For example, one or more of subsystems 124-126 may be eliminated, and some or all of its functionality may be provided by other ones of subsystems 124-126. As another example, additional subsystems may be programmed to perform some or all of the functionality attributed herein to one of subsystems 124-126.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, indicated otherwise, updating an item may include generating the item or modifying an existing time. Thus, updating a record may include generating a record or modifying the value of already-generated value.

ENUMERATED EMBODIMENTS

The present techniques will be better understood with reference to the following enumerated embodiments:

1. A method comprising: obtaining a first bigram via a first query during a session identifying a user; obtaining a set of trigrams and a set of bigrams from an n-grams table comprising natural language text descriptors of a plurality of datasets, wherein each trigram of the set of trigrams comprises the first bigram, and wherein each bigram of the set of bigrams comprises a terminal word of the first bigram; determining probabilities by: obtaining a first weight based on the first bigram from a search parameter record; determining a first subset of the probabilities by, for each trigram of the set of trigrams, determining a probability of the first subset based on an appearance count of the respective trigram in the n-grams table without determining an appearance count of the first bigram; determining a second weight based on the first bigram and the first subset; determining a second subset of the probabilities by, for each bigram of the set of bigrams, determining a probability of the second subset based on the second weight and an appearance count of the respective bigram in the n-grams table; determining an additional word for a predicted sequence comprising the first bigram based on the probabilities; determining a semantic vector based on the predicted sequence; and retrieving a set of datasets from a plurality of computing nodes based on a second query comprising the semantic vector.

2. The method of embodiment 1, wherein each sequence of the first word sequences comprises the input sequence, and wherein each sequence of the second word sequences comprises a portion of the input sequence.

3. The method of any of embodiments 1 to 2, wherein determining first scores comprises determining first scores without determining an appearance count of the input sequence.

4. A method comprising: obtaining, with a computer system, an input sequence via a query from a client computer device; obtaining, with the computer system, first word sequences and second word sequences of dataset metadata of a plurality of datasets, wherein each sequence of the first word sequences comprises the input sequence, and wherein each sequence of the second word sequences comprises a portion of the input sequence; determining, with the computer system, probabilities by: determining a first weight based on the input sequence; determining a first subset of the probabilities by, for each sequence of the first word sequences, determining a probability of the first subset of the probabilities based on an appearance count of the sequence of the first word sequences in the dataset metadata without determining an appearance count of the input sequence; determining a second weight based on the input sequence and the first subset of the probabilities; determining a second subset of the probabilities by, for each sequence of the second word sequences, determining a probability of the second subset of the probabilities based on the second weight and an appearance count of the respective second sequence in the dataset metadata; and determining, with the computer system, an additional word for a predicted sequence comprising the input sequence based on the first subset of the probabilities and the second subset of the probabilities; and retrieving, with the computer system, a set of datasets based on the predicted sequence.

5. A method comprising obtaining a first bigram via a first query during a session identifying a user; obtaining a set of trigrams and a set of bigrams from an n-grams table comprising natural language text descriptors of a plurality of datasets, wherein each trigram of the set of trigrams comprises the first bigram and each bigram of the set of bigrams comprises a terminal word of the first bigram; determining probabilities by: obtaining a first weight based on the first bigram from a search parameter record; determining a first subset of the probabilities by, for each trigram of the set of trigrams, determining a probability of the first subset based on an appearance count of the trigram in the n-grams table without determining an appearance count of the first bigram; determining a second weight based on the first bigram and the first subset; determining a second subset of the probabilities by, for each bigram of the set of bigrams, determining a probability of the second subset based on the second weight and an appearance count of the bigram in the n-grams table; determining an additional word for a predicted sequence comprising the first bigram based on the probabilities; determining a semantic vector based on the predicted sequence; retrieving a set of datasets from a plurality of computing nodes based on a second query comprising the semantic vector.

6. The method of any of embodiments 1 to 5, wherein: obtaining the first bigram comprises: obtaining a query word sequence of the first query; selecting a pair of words of the query word sequence; reversing the pair of words; obtaining the first bigram as the reversed pair of words; and a starting word of the predicted sequence is the additional word.

7. The method of any of embodiments 1 to 6, wherein obtaining the first bigram comprises obtaining the first bigram in association with an identifier of a user record, the operations further comprising: determining the search parameter record based on a category associated with the user record; identifying a second set of datasets of the plurality of datasets, wherein the second set of datasets is associated with the category; and updating the n-grams table based on an initial state of the n-grams table and the second set of datasets, wherein: data of the initial state of the n-grams table is filtered to include only data associated with the second set of datasets; determining the appearance count of at least one trigram in the n-grams table comprises counting appearances of the at least one trigram in the updated n-grams table; and determining the appearance count of at least one bigram in the n-grams table comprises counting appearances of the at least one bigram in the updated n-grams table.

8. The method of any of embodiments 1 to 7, wherein the set of datasets is a first set of datasets, the operations further comprising: determining a first elapsed time indicating an amount of time used to retrieve the first set of datasets; determining third probabilities and fourth probabilities by: determining a candidate first weight by modifying the first weight; determining a candidate second weight based on the candidate first weight; determining an updated first subset of the probabilities and an updated second subset of the probabilities based on the first weight and the second weight; determining a second additional word for a second predicted sequence based on the updated first subset and the updated second subset, the predicted sequence comprising the first bigram; retrieving a second set of datasets based on the second predicted sequence; determining a second elapsed time indicating an amount of time used to retrieve the second set of datasets; determining a performance score based on a difference between the first elapsed time and the second elapsed time; and updating the first weight with the candidate first weight.

9. The method of any of embodiments 1 to 8, wherein no additional query is received from the client computer device before the set of datasets is retrieved.

10. The method of any of embodiments 1 to 9, wherein retrieving the set of datasets comprises: generating a first vector based on the predicted sequence using a neural network; determining a set of vectors of a plurality of vectors based on the first vector, wherein: each vector of the set of vectors is within a predetermined distance of the first vector in a feature space of the first vector; each vector of the plurality of vectors is generated by the neural network; and retrieving the set of datasets based on the set of vectors.

11. The method of any of embodiments 1 to 10, wherein the neural network comprises an encoder-decoder neural network.

12. The method of any of embodiments 1 to 11, further comprising updating a corpora with the dataset metadata comprising dataset names and dataset descriptors by, for each respective dataset of the plurality of datasets, adding a respective dataset identifier, a respective dataset name of the dataset names, and a respective dataset descriptors of the dataset descriptors to the corpora, wherein obtaining the first word sequences and the second word sequences of the dataset metadata comprises obtaining the first word sequences and the second word sequences from the dataset names and the dataset descriptors stored in the corpora.

13. The method of any of embodiments 1 to 12, wherein determining the second subset of the probabilities comprises: determining an intermediate probability score based on a candidate word sequence, wherein the candidate word sequence comprises a third sequence of words, wherein the second word sequences comprises the third sequence of words; and determining whether the intermediate probability score satisfies a threshold, wherein determining the second subset of the probabilities comprises determining at least one probability of the second subset of the probabilities based on the third sequence of words in response to a determination that the intermediate probability score does not satisfy the threshold.

14. The method of any of embodiments 1 to 13, wherein determining the additional word comprises selecting the additional word by: determining a greatest probability of the first subset of the probabilities and the second subset of the probabilities; and selecting the additional word associated with the greatest probability.

15. The method of any of embodiments 1 to 14, wherein determining the additional word comprises: determining a selection value using a random or pseudorandom operation; determining a set of value ranges based on the first subset of the probabilities the and second subset of the probabilities; and selecting the additional word based on a determination that the selection value is in a range of the set of value ranges, wherein the range is associated with the additional word.

16. The method of any of embodiments 1 to 15, further comprising: obtaining an initial query string of the query; and determining whether a first word of the initial query string matches with a stopword of a stopwords dictionary, wherein obtaining the input sequence comprises removing the first word from the initial query string based on a determination that the first word matches with the stopword.

17. The method of any of embodiments 1 to 16, wherein retrieving the set of datasets based on the predicted sequence comprises: generating a query based on the predicted sequence; and sending the query to a plurality of computing nodes, wherein the plurality of computing nodes concurrently execute searches based on the query.

18. The method of any of embodiments 1 to 17, the operations further comprising: determining a plurality of scores based on the dataset metadata using a neural network, wherein each score of the plurality of scores is associated with a dataset of the set of datasets; obtaining an initial query string of the query, wherein the initial query string comprises the input sequence; determining a first score based on the initial query string using the neural network; determining a set of distances by, for each respective score of the plurality of scores, determining a respective distance of the set of distances based on the respective score and the first score; and sorting the set of datasets based on a set of distances.

19. The method of any of embodiments 1 to 18, the operations further comprising: obtaining a history of previous search queries; updating a weight parameter for a previous search query based on the history of previous search queries, wherein: the previous search query comprises the additional word; and determining the additional word comprises selecting the additional word based on the weight parameter.

20. The method of any of embodiments 1 to 19, wherein the set of datasets is a first set of datasets, and wherein retrieving the set of datasets further comprises: retrieving a second set of datasets based on the input sequence; and retrieving the first set of datasets by searching the second set of datasets based on the predicted sequence.

21. The method of any of embodiments 1 to 20, wherein retrieving the set of datasets comprises using multi-threading to concurrently search through a set of databases used to store the set of datasets.

22. The method of any of embodiments 1 to 21, further comprising: obtaining a first set of descriptors, wherein each descriptor of the set of descriptors comprises a first sequence of words written in association with a dataset of the plurality of datasets; obtaining a second set of descriptors, wherein each descriptor of the second set of descriptors comprises a second sequence of words written in association with a different field of at least one dataset of the plurality of datasets; wherein retrieving the set of datasets comprises: matching the predicted sequence with a first word sequence of the first set of descriptors, wherein the first word sequence of the first set of descriptors is associated with a first dataset; matching the predicted sequence with a second word sequence of the second set of descriptors, wherein the second word sequence of the second set of descriptors is associated with a field of a second dataset; and retrieving a first identifier of the first dataset and a second identifier of the second dataset.

23. One or more tangible, non-transitory, machine-readable media storing instructions that, when executed by one or more processors, effectuation operations comprising those of any of embodiments 1-22.

24. A system comprising: one or more processors; and memory storing computer program instructions that, when executed by the one or more processors, cause the one or more processors to effectuate operations comprising those of any of embodiments 1-22.

What is claimed is:

1. A system for dataset retrieval through sequence prediction comprising a computer system that comprises one or more processors programmed with computer program instructions that, when executed, cause the computer system to perform operations comprising:

extracting a first bigram from a first query during a session;

obtaining, from an n-grams table indexed by n-grams for fast retrieval of data related to n-grams, a set of trigrams and a set of bigrams comprising natural language text descriptors of a plurality of datasets, wherein each trigram of the set of trigrams comprises the first bigram, and wherein each bigram of the set of bigrams comprises a terminal word of the first bigram;

obtaining a first weight based on the first bigram from a search parameter record;

determining a first subset of probability scores by, for each trigram of the set of trigrams, determining a probability score of the first subset based on an appearance count of the respective trigram in the n-grams table without determining an appearance count of the first bigram;

determining a second weight based on the first bigram and the first subset;

determining a second subset of probability scores by, for each bigram of the set of bigrams, determining a probability score of the second subset based on the second weight and an appearance count of the respective bigram in the n-grams table;

generating a predicted sequence that comprises the first bigram to increase search accuracy by (i) predicting an additional word based on the first and second subsets of probability scores and (ii) positioning the additional word into the predicted sequence;

generating a semantic vector in a feature space based on the predicted sequence; and retrieving a set of datasets by determining feature space distances between the semantic vector and a set of vectors of the feature space associated with the set of datasets.

2. The system of claim 1, wherein:

extracting the first bigram comprises:
obtaining a query word sequence of the first query;
selecting a pair of words of the query word sequence; and
reversing the pair of words to use the reversed pair of words as the first bigram; and generating the predicted sequence comprises using the additional word as a starting word of the predicted sequence.

3. The system of claim 1, wherein obtaining the first bigram comprises obtaining the first bigram in association with an identifier of a user record, the operations further comprising:

determining the search parameter record based on a category associated with the user record;

identifying a second set of datasets of the plurality of datasets, wherein the second set of datasets is associated with the category; and updating the n-grams table based on an initial state of the n-grams table and the second set of datasets, wherein:
data of the initial state of the n-grams table is filtered to include only data associated with the second set of datasets;
determining the appearance count of at least one trigram in the n-grams table comprises counting appearances of the at least one trigram in the updated n-grams table; and
determining the appearance count of at least one bigram in the n-grams table comprises counting appearances of the at least one bigram in the updated n-grams table.

4. The system of claim 1, wherein the set of datasets is a first set of datasets, the operations further comprising:
   determining a first elapsed time indicating an amount of time used to retrieve the first set of datasets;
   determining third probabilities and fourth probabilities by:
      determining a candidate first weight by modifying the first weight;
      determining a candidate second weight based on the candidate first weight;
      determining an updated first subset of the probabilities and an updated second subset of the probabilities based on the first weight and the second weight;
      determining a second additional word for a second predicted sequence based on the updated first subset and the updated second subset, the predicted sequence comprising the first bigram;
   retrieving a second set of datasets based on the second predicted sequence;
   determining a second elapsed time indicating an amount of time used to retrieve the second set of datasets;
   determining a performance score based on a difference between the first elapsed time and the second elapsed time; and
   updating the first weight with the candidate first weight.

5. A method comprising:
   extracting an input sequence via a query from a client computer device;
   obtaining, from an n-grams table, first word sequences and second word sequences, wherein each sequence of the first word sequences comprises the input sequence, and wherein each sequence of the second word sequences comprises a portion of the input sequence;
   determining a first weight based on the input sequence;
   determining a first subset of probability scores by, for each sequence of the first word sequences, determining a probability score of the first subset of probability scores based on an appearance count of the respective sequence of the first word sequences in the n-grams without determining an appearance count of the input sequence;
   determining a second weight based on the input sequence and the first subset of probability scores;
   determining a second subset of probability scores by, for each sequence of the second word sequences, determining a probability score of the second subset of probability scores based on the second weight and an appearance count of the respective second word sequence in the n-grams table; and
   generating a predicted sequence that comprises the input sequence by predicting, an additional word for the predicted sequence based on the first and second subsets of probability scores;
   generating a first vector in a feature space based on the predicted sequence; and
   retrieving a set of datasets by determining a set of feature space distances between the first vector and a set of vectors of the feature space associated with the set of datasets.

6. The method of claim 5, wherein no additional query is received from the client computer device before the set of datasets is retrieved.

7. The method of claim 5, wherein retrieving the set of datasets comprises:
   determining a set of results indicating that. for each respective vector of the set of vectors, a respective feature space distance between the respective vector and the first vector is within a predetermined distance; and
   retrieving the set of datasets based on the set of results.

8. The method of claim 7, wherein generating the first vector comprises generating the first vector using a neural network. and wherein the neural network comprises an encoder-decoder neural network.

9. The method of claim 5, wherein the first word sequences and second word sequences are obtained from dataset metadata of a plurality of datasets comprising the set of datasets, further comprising updating a corpora with the dataset metadata comprising dataset names and dataset descriptors by, for each respective dataset of the plurality of datasets, adding a respective dataset identifier, a respective dataset name of the dataset names, and a respective dataset descriptors of the dataset descriptors to the corpora, wherein obtaining the first word sequences and the second word sequences of the dataset metadata comprises obtaining the first word sequences and the second word sequences from the dataset names and the dataset descriptors stored in the corpora.

10. The method of claim 5, wherein determining the second subset of the probabilities comprises:
   determining an intermediate probability score based on a candidate word sequence, wherein the candidate word sequence comprises a third sequence of words, wherein the second word sequences comprises the third sequence of words; and
   determining whether the intermediate probability score satisfies a threshold, wherein determining the second subset of the probabilities comprises determining at least one probability of the second subset of the probabilities based on the third sequence of words in response to a determination that the intermediate probability score does not satisfy the threshold.

11. The method of claim 5, wherein determining the additional word comprises selecting the additional word by:
   determining a greatest probability of the first subset of the probabilities and the second subset of the probabilities; and
   selecting the additional word associated with the greatest probability.

12. The method of claim 5, wherein determining the additional word comprises:
   determining a selection value using a random or pseudo-random operation;
   determining a set of value ranges based on the first subset of the probabilities the and second subset of the probabilities; and
   selecting the additional word based on a determination that the selection value is in a range of the set of value ranges, wherein the range is associated with the additional word.

13. The method of claim 5, further comprising:
   obtaining an initial query string of the query; and
   determining whether a first word of the initial query string matches with a stopword of a stopwords dictionary, wherein obtaining the input sequence comprises removing the first word from the initial query string based on a determination that the first word matches with the stopword.

14. The method of claim 5, wherein retrieving the set of datasets based on the predicted sequence comprises:
   generating a query based on the predicted sequence; and sending the query to a plurality of computing nodes, wherein the plurality of computing nodes concurrently execute searches based on the query.

15. One or more non-transitory, machine-readable media storing program code that, when executed by one or more processors, causes the one or more processors to perform operations comprising:
   extracting an input sequence from a query;
   obtaining, from an n-grams table indexed by n-grams. first word sequences and second word sequences, wherein each sequence of the first word sequences comprises the input sequence, and wherein each sequence of the second word sequences comprises a portion of the input sequence;
   determining first scores by determining a score of the first scores based on an appearance count of the respective word sequence of the first word sequences in the grams table without determining an appearance count of the input sequence;
   determining second scores by determining a score of the second scores based on an appearance count of the respective second word sequence in the n-grams table;
   generating a predicted sequence that comprises the input sequence by predicting an additional word for the predicted sequence based on the first scores and the second scores;
   generating a first vector in a feature space based on the predicted sequence; and
   retrieving a set of datasets by determining a set of feature space distances between the first vector and a set of vectors of the feature space associated with the set of datasets.

16. The one or more machine-readable media of claim 15, wherein retrieving the set of datasets comprises sorting the set of datasets based on the set of feature space distances.

17. The one or more machine-readable media of claim 15, the operations further comprising:
   obtaining a history of previous search queries;
   updating a weight parameter for a previous search query based on the history of previous search queries, wherein:
      the previous search query comprises the additional word; and
      predicting the additional word comprises selecting the additional word based on the weight parameter.

18. The one or more machine-readable media of claim 15, wherein the set of datasets is a first set of datasets, and wherein retrieving the set of datasets further comprises:
   retrieving a second set of datasets based on the input sequence; and
   retrieving the first set of datasets by searching the second set of datasets based on the predicted sequence.

19. The one or more machine-readable media of claim 15, wherein retrieving the set of datasets comprises using multi-threading to concurrently search through a set of databases used to store the set of datasets.

20. The one or more machine-readable media of claim 15, wherein the first word sequences and second word sequences are obtained from dataset metadata of a plurality of datasets comprising the set of datasets, further comprising:
   obtaining a first set of descriptors, wherein each descriptor of the set of descriptors comprises a first sequence of words written in association with a dataset of the plurality of datasets;
   obtaining a second set of descriptors, wherein each descriptor of the second set of descriptors comprises a second sequence of words written in association with a different field of at least one dataset of the plurality of datasets;
   wherein retrieving the set of datasets comprises:
      matching the predicted sequence with a first word sequence of the first set of descriptors, wherein the first word sequence of the first set of descriptors is associated with a first dataset;
      matching the predicted sequence with a second word sequence of the second set of descriptors, wherein the second word sequence of the second set of descriptors is associated with a field of a second dataset; and
      retrieving a first identifier of the first dataset and a second identifier of the second dataset.

* * * * *